July 3, 1923.
H. I. HARVEY
AUTOMATIC BASTER FOR COOKING
Filed June 19, 1922
1,460,486
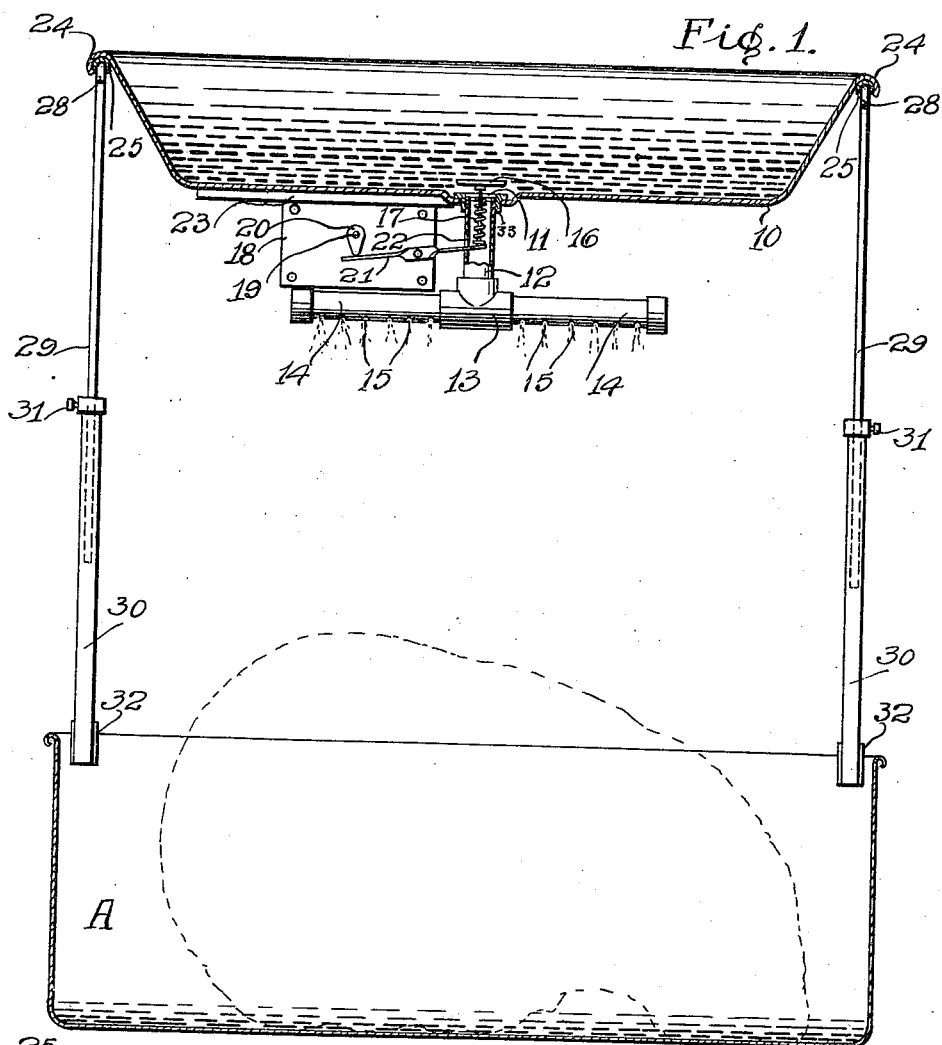
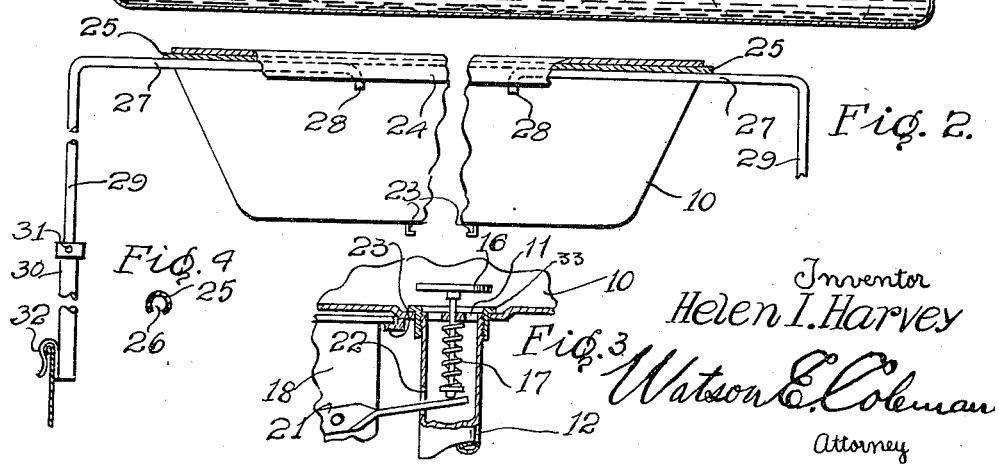
Inventor
Helen I. Harvey
Watson E. Coleman
Attorney

Patented July 3, 1923.

1,460,486

UNITED STATES PATENT OFFICE.

HELEN IRENE HARVEY, OF BUTTE, MONTANA.

AUTOMATIC BASTER FOR COOKING.

Application filed June 19, 1922. Serial No. 569,206.

*To all whom it may concern:*

Be it known that I, HELEN IRENE HARVEY, a citizen of the United States, residing at Butte, in the county of Silver Bow and State of Montana, have invented certain new and useful Improvements in Automatic Basters for Cooking, of which the following is a specification, reference being had to the accompanying drawings.

This invention relates to culinary devices, and particularly to means for basting fowls, meat which is being roasted, or other food being cooked.

In roasting fowls and other meat and in other culinary operations, it is necessary to baste the meat with water every little while, and the object of the present invention is to provide a device by which fowl or other meat while being cooked will be automatically basted at uniform intervals.

A further object is to provide a device of this character which is adapted to be disposed upon and adjusted to any ordinary sized roaster or other pan in which the article is being cooked.

A still further object is to provide a construction of this character in which the basting pan has a valve, and to provide means operating at intervals for lifting the valve and permitting the liquid contained in the basting pan to be discharged into the pan below and upon the material contained in the pan.

Another object is to so construct the device that it may be adjusted to suit various sized roasting pans.

My invention is illustrated in the accompanying drawings, wherein:—

Figure 1 is a vertical section of a roasting pan with my basting appliance mounted thereon;

Figure 2 is a fragmentary end elevation of the basting pan partly in section and showing in section a portion of the roasting pan;

Figure 3 is an enlarged sectional view of the bottom of the basting pan and the valve mechanism therefor;

Figure 4 is a transverse section through one of the pipes 25.

Referring to these drawings, 10 designates a basting pan, which may be of any suitable size, and which is provided with a discharge opening 11. Extending from this opening is a pipe 12 which is fitted into the opening 11 in any suitable manner and which at its lower end engages an elbow 13 having the branch pipe 14 connected at their ends and provided with downwardly discharging perforations 15. Normally closing the opening 11 is a valve 16 having a stem extending down into the pipe 12, and surrounding this stem is a spring 17 which urges the valve to a closed position. Disposed at one side of the pipe 12 is a casing 18 having clock work or any other suitable motor, this motor including a shaft 19. The shaft 19 carries upon it an eccentric or cam 20 which is adapted to engage with the adjacent end of a tappet lever 21, the other end of which passes through a slot 22 in the pipe 12 and engages the lower end of the valve stem.

Normally the valve 16 will be held closed by the spring 17, but as the shaft 19 revolves, the cam 20 will strike the end of the lever 21 and depress it, raising the opposite end of the lever and raising the valve against the action of the spring 17. Then the water or other liquid contained within the pan 10 is discharged through the pipe 12 into the pipes 14 and in turn is discharged downward through the openings 15 into the roasting pan A below. Preferably the housing 18 which contains the clockwork or other motor is mounted in guides 23 so that it may be removed from beneath the pan or readily put in place.

The ends of the pan are overturned to form beads 24, and supported within these beads or in any other suitable manner upon the ends of the pan are the pipes 25 which are longitudinally slotted, as at 26. Each pipe 25 is slightly longer than the width of the pan, and the slot 26 runs the entire length of the pipe. Into this pipe are fitted two L-shaped bars 27, one end of the bar having a slight downward portion, as at 28, and the other end extending downward to form a leg 29. Coacting with this leg portion 29 is a telescopic leg portion 30 tubular to receive the leg 29 and having therein a set-screw 31 whereby the tubular section 30 may be held in adjusted position upon the leg section 29. It will be understood that the parts 29 and 30 together constitute a leg and that there are preferably four legs for each pan. The lower end of the tubular section 30 is provided with a spring clip 32 which is adapted to fit over the rim of the roaster or pan to which this baster is to be applied.

In the use of this device, the baster is fitted to any size roaster or pan by adjusting the legs to the width of the roaster or pan, slipping the clips over the edge of the roaster, and then adjusting the basting pan to the desired height by means of the set-screws 31. The basting pan is then filled with water and the clockwork wound and set. It is then placed over the article which is being roasted and placed in the oven. The cam shaft 19 revolves at any desired speed and the extremity of the cam engages one end of the lever and thus lifts the valve to allow a certain amount of water to fall through the pipes onto the meat below. When the pressure of the cam is released on the lever, the valve returns to its original position.

The apparatus is designed to be readily dismountable so that it may be readily cleansed. Preferably the pan which contains the water is twelve inches long and six inches wide, though obviously these dimensions may be varied. The legs and pan are preferably made of aluminum. Of course, I do not wish to be limited to the use of clockwork for driving the cam 20, as any motor might be used for this purpose. Obviously also the details of construction might be varied and the arrangement of parts changed without departing from the spirit of the invention.

It is to be noted that the periods of sprinkling, that is the period when the valve is opened, and the duration of each sprinkling period can be varied by altering the shape of the cam 20, and by this means also the degree of opening the valve may be varied.

When it is desired to disassemble the parts for cleaning, it is only necessary to shift the clock case 18 laterally upon the guides 23, which will withdraw the tappet from the slot 22. The pipe 12 is illustrated as being engaged at its upper end with a screw-threaded bushing 33 and by rotating this bushing 33 to unscrew it the pipe 12 may be readily disconnected from the tank 10, thus permitting the removal of the pipe 12 and the cleansing of the pipe, valve, etc. It will be obvious that other means whereby a ready disconnection of the pipe 12 from the tank is secured may be provided. The legs, of course, may be readily removed at any time for packing or for cleaning the pan.

I claim:—

1. A basting attachment for roasting pans comprising a container having means whereby it may be supported above the roasting pan, a perforated outlet pipe operatively connected to the container and discharging upon the material in the roasting pan, a valve controlling the discharge from said outlet pipe, and means automatically causing the opening of the valve at uniform intervals.

2. An automatic basting attachment for roasting pans comprising a basting container having means whereby it may be supported upon and above a roasting pan, a pipe leading therefrom and formed with branches having downwardly discharging openings, a valve controlling passage through said pipe, a spring holding the valve closed, and automatically operative means for lifting the valve at intervals.

3. An automatic basting attachment for roasting pans comprising a basting container having means whereby it may be supported upon and above a roasting pan, a pipe leading therefrom and formed with branches having downwardly discharging openings, a valve controlling passage through said pipe, a spring holding the valve closed, automatically operated means for lifting the valve at intervals including a lever engaging the valve, and a cam shaft having a cam engaging the lever.

4. A basting attachment comprising a container for basting liquid and having legs, the lower ends of the legs being formed to detachably engage a basting pan, a valved outlet from the bottom of the container, and constantly operating motor operated means for periodically opening and closing said outlet.

5. A basting attachment for roasting pans comprising a container for the basting liquid having a downwardly extending discharge pipe with horizontal, perforated branches, a normally closed valve controlling flow from said pan to the discharge pipe, motor operated, periodically operating valve lifting mechanism mounted upon the container, and legs engaging opposite ends of the pan, said legs being adjustable toward or from each other and formed at their lower ends to engage the roasting pan.

6. A basting attachment for roasting pans comprising a container for the basting liquid having a downwardly extending discharge pipe with horizontal, perforated branches, a normally closed valve controlling flow from said pan to the discharge pipe, motor operated, periodically operating valve lifting mechanism mounted upon the container, and legs engaging opposite ends of the pan, said legs being adjustable toward or from each other and formed at their lower ends to engage the roasting pan, said legs being adjustable toward or from each other and each of said legs consisting of two sections having telescopic engagement with each other, the lower ends of the legs being provided with means for detachably engaging a basting pan.

7. A basting attachment for roasting pans comprising a container for the basting liquid having a downwardly extending discharge pipe with horizontal, perforated branches, a normally closed valve controlling flow from said pan to the discharge pipe, motor operated, periodically operating valve lifting mechanism mounted upon the container, the ends of the basting pan carrying longitudinally slotted, tubular members, leg sections having angular ends inserted and moving longitudinally along said tubular members, the leg sections projecting from the slots thereof, and leg sections having telescopic engagement with the first named leg sections and forming continuations thereof. said last named leg sections having clips at their lower ends for engagement with the bottom of a roasting pan.

8. A basting attachment for roasting pans comprising a container for the basting liquid having a downwardly extending discharge pipe with a spraying portion, a normally closed valve controlling flow from said pan to the discharge pipe, the discharge pipe having a slot adjacent the lower end of the pan, a motor including a motor casing detachably and slidably mounted upon the bottom of the pan, a lever carried by the casing of the motor and having one end passing through said slot in the discharge pipe and engaging the valve, and motor operated means for intermittently depressing said lever, the discharge pipe being detachably connected with the pan.

In testimony whereof I hereunto affix my signature.

HELEN IRENE HARVEY.